US012322141B2

(12) United States Patent
Nguyen et al.

(10) Patent No.: US 12,322,141 B2
(45) Date of Patent: Jun. 3, 2025

(54) COMPONENT CALIBRATION USING MOTION CAPTURE SENSOR DATA

(71) Applicant: Motional AD LLC, Boston, MA (US)

(72) Inventors: Huy Nguyen, Singapore (SG); Marius Lukas Brühlmeier, Singapore (SG); Joshua Fabian, Las Vegas, NV (US); Jun Shern Chan, Sungai Buloh (MY)

(73) Assignee: Motional AD LLC, Boston, MA (US)

( * ) Notice: Subject to any disclaimer, the term of this patent is extended or adjusted under 35 U.S.C. 154(b) by 368 days.

(21) Appl. No.: 17/664,830

(22) Filed: May 24, 2022

(65) Prior Publication Data

US 2023/0386083 A1 Nov. 30, 2023

(51) Int. Cl.
*G06T 7/80* (2017.01)
*G05D 1/00* (2006.01)
*G06T 7/20* (2017.01)
*G06T 7/70* (2017.01)

(52) U.S. Cl.
CPC ............. *G06T 7/85* (2017.01); *G05D 1/0234* (2013.01); *G05D 1/0242* (2013.01); *G06T 7/20* (2013.01); *G06T 7/70* (2017.01); *G06T 2207/10048* (2013.01); *G06T 2207/30204* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

2022/0198713 A1 6/2022 Momcilovic et al.

FOREIGN PATENT DOCUMENTS

CN 110386147 A 10/2019

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2300778.4, dated Jul. 14, 2023.

*Primary Examiner* — Lennin R Rodriguezgonzalez
(74) *Attorney, Agent, or Firm* — Knobbe, Martens, Olson & Bear, LLP

(57) ABSTRACT

Provided are methods for using motion capture sensors to calibrate a component, which can include receiving motion capture sensor data associated with a motion capture sensor, the motion capture sensor data comprising at least a location of a motion capture marker and a location of a reference point on a vehicle, determining a position of a hardware component associated with the vehicle relative to the reference point on the vehicle based at least in part on the motion capture sensor data, determining the position of the hardware component does not satisfy a calibration threshold associated with the hardware component, determining a hardware component alert associated with the hardware component based at least in part on the determining that the position of the hardware component does not satisfy the calibration threshold associated with the hardware component, and routing the hardware component alert. Systems and computer program products are also provided.

20 Claims, 8 Drawing Sheets

COMPONENT CALIBRATION USING MOTION CAPTURE SENSOR DATA

DETAILED DESCRIPTION

Figure 1:
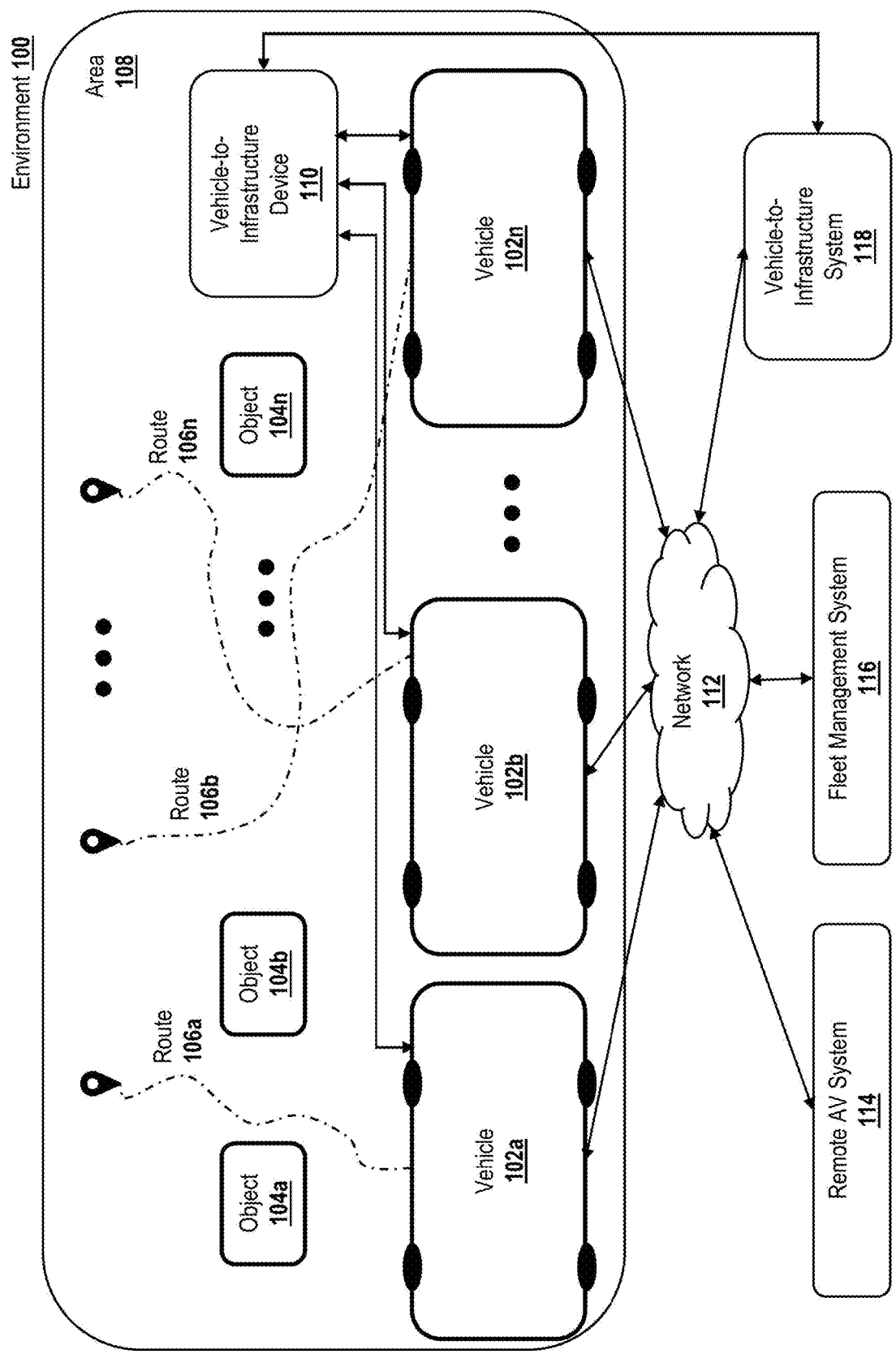
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that receives motion capture sensor data, determines a position (e.g., a location) of a hardware component based at least in part on the motion capture sensor data, determines the position of the hardware component does not satisfy a calibration threshold, determines a hardware component alert, and routes the hardware component alert. During the operation of a vehicle, the calibration of the hardware components may degrade. For example, the physical position of an image sensor may degrade from an initial calibration specification or threshold. As degradations in the position of the hardware components can decrease the safety of the vehicle for passengers, it may desirable to determine how the position of the hardware components has degraded over time to recalibrate the hardware components. Without recalibration of the hardware components, the perception system to not identify objects and/or to identify objects in incorrect locations. Further, recalibration methods such as manual calibration may include the manual repositioning of the hardware components. Such a manual calibration may be inefficient and inaccurate. To provide a more accurate and efficient recalibration of the hardware components, the signal processing system may determine whether to recalibrate the hardware components based on relative position data (e.g., location data, motion capture sensor data, etc.). While motion capture sensor data may be referred to throughout, any relative position data (including non-motion based data) may be utilized. To perform the recalibration of the hardware component, the signal processing system can receive motion capture sensor data associated with a motion capture sensor. For example, the motion capture sensor can be affixed to a vehicle (e.g., the motion capture sensor may be an image sensor (e.g., camera image sensor, radar sensor, lidar sensor, etc.) of the vehicle) or can be separate from the vehicle. The motion capture sensor data may include a location of a motion capture marker and a location of a reference point on the vehicle. For example, the motion capture marker can be affixed to the hardware component (e.g., an image sensor) or to a target of a motion capture sensor of the vehicle. The signal processing system can determine the position of the hardware component relative to the reference point on the vehicle based on the motion capture sensor data. Based on the determined position and the calibration threshold, the signal processing system can determine a hardware component alert for the vehicle. As a non-limiting example, the signal processing system can determine that the hardware component is not extrinsically calibrated and route the hardware component alert to a separate computing system to cause the extrinsic calibration of the hardware component.

By virtue of the implementation of systems, methods, and computer program products described herein, a system can test the extrinsic calibration of hardware components of a vehicle (e.g., whether a hardware component is extrinsically calibrated) by scanning the hardware components and/or targets using motion capture sensors. Based on the scanning of the hardware components and/or the targets, the system can identify deviations from calibration specifications or thresholds. To determine how the position of the hardware components changes over time, the system can identify initial calibration data for hardware components with motion capture markers that are placed in a fixed position. For hardware components with motion capture markers that are placed in modifiable positions (e.g., motion capture marker stickers), the system can receive initial calibration data for the hardware components from a computing device (e.g., based on a manual calibration). The system can compare the position of the hardware component with the initial calibration data to determine a change in the position of the hardware component. Based on the change in the position of the hardware component, the system can generate hardware component alerts that identify whether hardware components require recalibration. The system can more efficiently track the position of the hardware components in a hardware agnostic manner over time by scanning the hardware components without removing or dismounting the hardware components from the vehicle. By scanning the hardware components without removing or dismounting the hardware components, the system can verify the extrinsic calibration of the hardware components without recalibrating the hardware components. The testing of the extrinsic calibration of the hardware components using motion capture sensor data can improve the accuracy and increase the efficiency associated with the testing of the extrinsic calibration of the hardware components. Such a testing of the extrinsic calibration of the hardware components can also increase the safety associated with the vehicle by enabling the hardware components to be calibrated in a more efficient and more cost effective manner. Additionally, such a testing of the extrinsic calibration of the hardware components can provide additional efficiency for the recalibration process by enabling real time monitoring of degradation of the position of hardware components. For example, the system can quantify deformation of the position of the hardware components over time and more accurately predict when recalibration is required. Such a testing of the extrinsic calibration of the hardware components can also enable a more efficient and less time consuming process for confirming the extrinsic calibration of the hardware components. Additionally, the testing of the extrinsic calibration of the hardware components may include less computer computations than other methods of calibrating hardware components.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
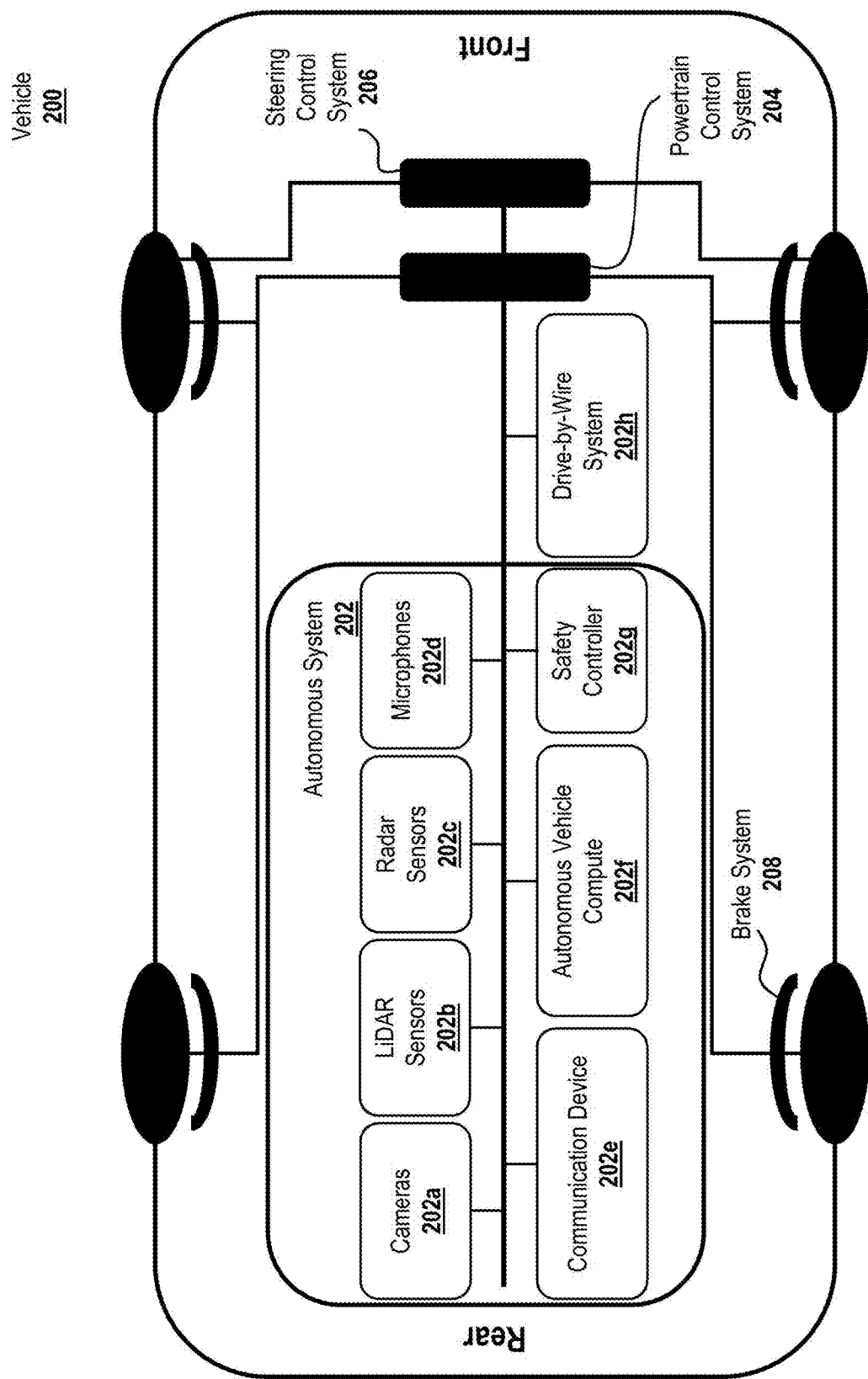
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
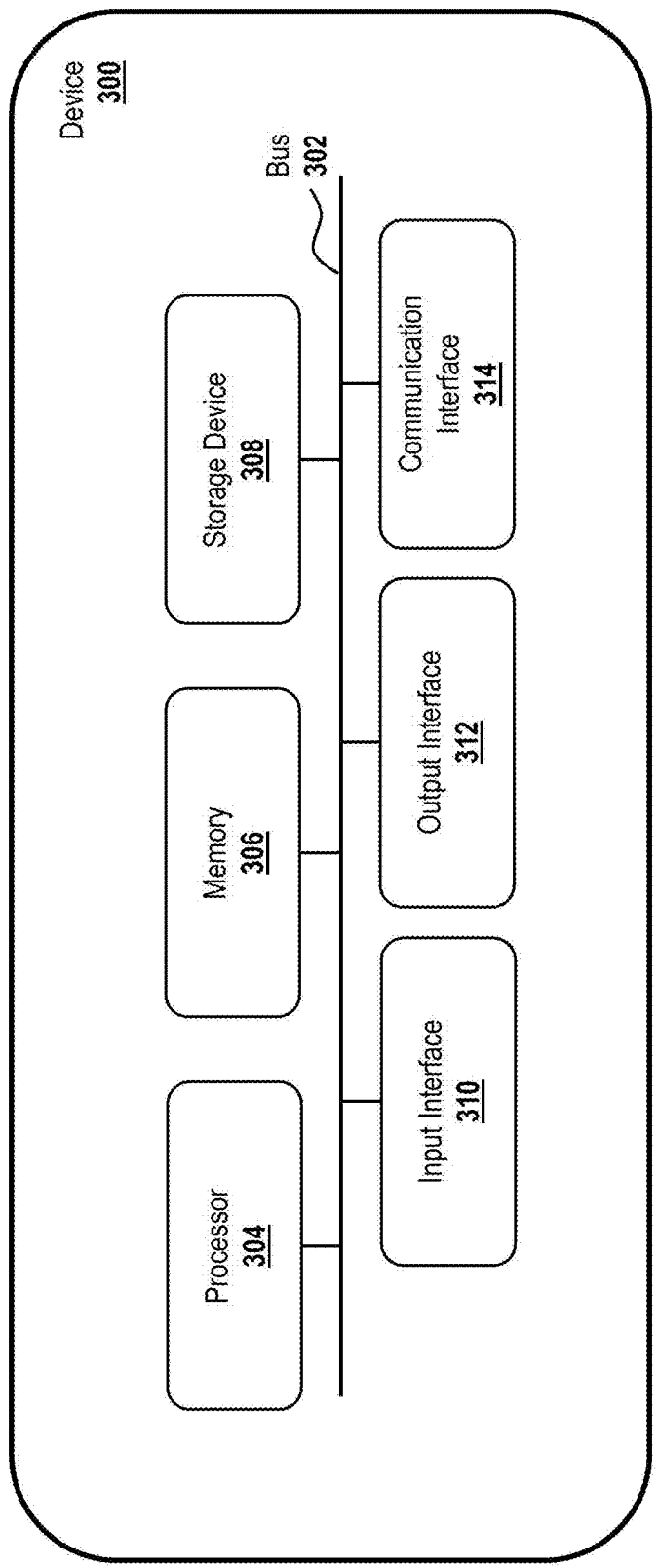
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
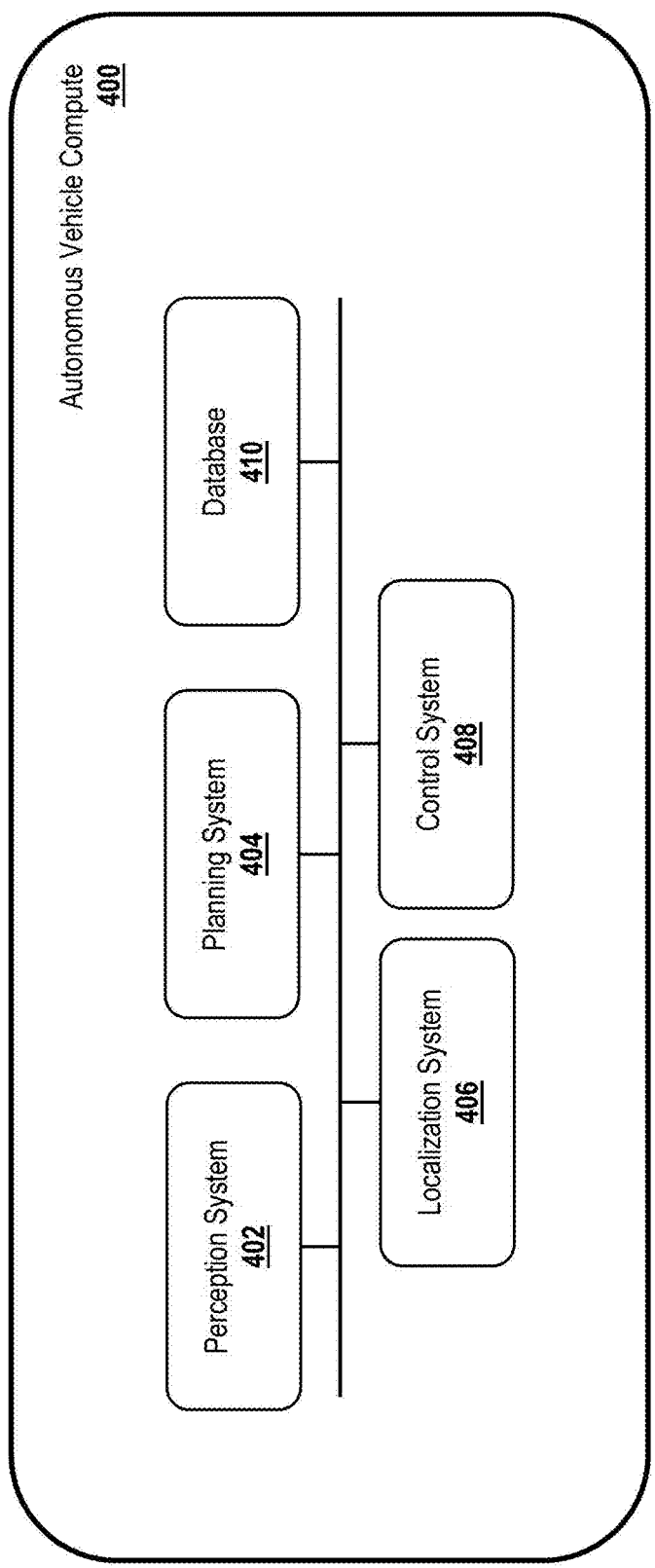
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Generating Hardware Component Alerts Based on Motion Capture Sensor Data

A vehicle (e.g., an autonomous vehicle) can include various hardware components. The hardware components can include electrical components and non-electrical components. For example, the hardware components include sensors, doors, windows, sun roofs, moon roofs, handles, covers (e.g., charging port covers), caps (e.g., a gas cap), rims, tires, frames or portions of a frame, a trunk, a hood, mirrors (e.g., a rear view mirror, a side mirror, etc.), antennas, or any other hardware components associated with the vehicle (e.g., affixed to the vehicle).

As a vehicle moves through an area, the vehicle may encounter a number of different objects within an area. To identify the objects, the vehicle can capture sensor data associated with at least one of the hardware components (e.g., the sensors). The sensors can include any one or any combination of radar sensors, lidar sensors, cameras, etc. The vehicle can process the captured sensor data to obtain environmental data associated with an environment of the vehicle. Based on the environmental data, the vehicle can determine how to navigate the environment and potential obstacles within the environment that are captured by the sensor data. Further, the vehicle can navigate the environment based on the determination. For example, the vehicle can include a navigational system to assist in navigation based on the environmental data.

It may be important to ensure that each of the hardware components of the vehicle be extrinsically calibrated to improve an experience of a passenger of the vehicle. The non-calibration of a hardware component of the vehicle may affect the performance of the vehicle. For example, the non-calibration of a particular hardware component (e.g., a sensor, a trunk, a window, etc.) may affect the operation of the vehicle and the ability of the vehicle to operate in a specified manner.

Each of the hardware components can be extrinsically calibrated relative to the vehicle and/or one or more components of the vehicle. The extrinsic calibration of the hardware components can include calibrating a positioning of each of the hardware components relative to the positioning of the vehicle, the positioning of additional hardware components, or the positioning of a reference point of the vehicle. For example, the position of an antenna may be extrinsically calibrated relative to a reference point of the vehicle (e.g., a central point on the vehicle). The hardware components may be mounted to the vehicle based on the extrinsic calibration of the hardware components.

For sensors of the vehicle, it may be important to ensure that each of the sensors be calibrated to determine an accuracy of the received image data. Each of the sensors can be extrinsically calibrated relative to the vehicle and/or one or more components of the vehicle and intrinsically calibrated. The intrinsic calibration of the sensors can include calibrating one or more parameters of the sensor used by the sensor to generate sensor data. For example, the parameters of an image sensor include focal length, image sensor format, principal point, or skew. The sensors can be mounted to the vehicle based on the extrinsic calibration and the intrinsic calibration (e.g., the sensors may have an initial extrinsic calibration and an initial intrinsic calibration when mounted to the vehicle). The vehicle may use the initial extrinsic calibration and initial intrinsic calibration of each sensor to identify objects in the environment of the vehicle based on the received sensor data.

During the operation of a vehicle, the calibration of the hardware components may degrade. For example, the position of an image sensor degrades from an initial calibration specification or threshold (e.g., an initial extrinsic calibration and/or an initial intrinsic calibration). The initial extrinsic calibration of the hardware components can degrade as a position of the hardware components degrades (e.g., moves from a first position to a second position). It may be desirable to determine how the position of the hardware component has degraded over time (e.g., relative to the initial extrinsic calibration of the hardware component). Degradations in the position of the hardware components can decrease the safety of the vehicle for passengers as the system may not be able to accurately identify the location of objects or features of an image (e.g., a position of another vehicle relative to an image sensor). For example, the position of an image sensor may degrade and the images produced by the image sensor may represent different areas or portions of an environment than expected by the perception system (e.g., the image sensor shifts 5 centimeters and identifies different sensor data) or the image sensor may be unable to produce images relative to a particular location, thereby making it difficult for the perception system to accurately identify the location of objects in the environment. This may cause the perception system to not identify objects and/or to identify objects in incorrect locations.

The perception system may expect an image sensor to capture sensor data associated with a first portion of an environment and, due to the degradation of the position of the image sensor, the image sensor may capture sensor data associated with a second portion of the environment. As the perception system may associate the sensor data associated with a second portion of the environment with the first portion of the environment this can lead to potential issues. This can also lead to an inadequate user experience as the perception system may be unable to identify particular objects or features of an image.

In some cases, the hardware components can be extrinsically calibrated by determining a calibration algorithm associated with the hardware component and using the calibration algorithm to individually calibrate the particular hardware component. For example, each of the hardware components is manually calibrated using calibration algorithms associated with the hardware components. The hardware components may include multiple subsets of hardware components each associated with a particular calibration algorithm. Further, the extrinsic calibration may include dismounting the hardware components from the vehicle and individually calibrating each hardware component. However, such an individual, manual calibration of the hardware components based on the calibration algorithm and the dismounting and recalibration of the hardware components can be expensive and time consuming. Further, in some cases, the calibration of each of the hardware components is not appropriate for each hardware component. For example, a hardware component that has retained an original extrinsic calibration can be dismounted from the vehicle. This can lead to an inadequate user experience as the system may be limited to recalibrating hardware components that are each dismounted from the vehicle.

In some cases, the hardware components can be extrinsically calibrated by performing target-based calibration. Each of the hardware components can identify a target (e.g., a target displayed in a field of view of a hardware component) and generate sensor data identifying the target. The extrinsic calibration between multiple hardware components can be identified based on the received sensor data. However, such a target-based calibration is dependent on the quality of the targets and the accuracy of the positioning of the targets. The target-based calibration requires an accurate target with a known position to enable the accurate determination of the extrinsic calibration of the hardware components. The target-based calibration may require the manual placement and/or movement of the target within the view of the hardware components. If the target is not placed in a correct position (e.g., the position of the target is not accurately known) and/or the hardware components are unable to identify the target, the target-based calibration may be inaccurate. Therefore, the target-based calibration based on the manual placement and/or movement of the target may be inefficient and inaccurate. The manual target-based calibration may be performed infrequently based on the manual nature of the calibration. Such an infrequent calibration can lead to an inadequate user experience as the calibration of the hardware components degrades. Further, in some cases, particular targets are not appropriate for the calibration of each hardware component. For example, a first target may be appropriate for a calibration of a first hardware component with first properties (e.g., a camera) and a second target may be appropriate for a calibration of a second hardware component with second properties (e.g., a radar sensor). Additionally, in some cases, particular targets are not appropriate for each hardware component based on the properties of the hardware components. For example, a camera with first properties (e.g., focal length, aperture, depth of field, etc.) requires a higher quality target than a camera with second properties. The use of the same target for each hardware component may lead to inaccurate results and non-calibrated hardware components. Therefore, target-based calibration may be hardware component dependent. Additionally, the target-based calibration may be goal-specific and the targets utilized may be based on the level of calibration for each hardware component. Such a manually intensive calibration may lead to an inadequate user experience as the system may implement different types of extrinsic calibration for each different hardware component.

To address these issues, a signal processing system can use one or more motion capture sensors to verify the extrinsic calibration of the hardware components in a hardware-agnostic manner without dismounting the hardware components from the vehicle. By using motion capture sensor data from one or more motion capture sensors, the signal processing system can obtain the motion capture sensor data and verify the extrinsic calibration of multiple hardware components in a hardware-agnostic manner. For example, the signal processing system obtains motion the motion capture sensor data and verifies the extrinsic calibration of a rim and a lidar sensor. The motion capture sensors can utilize motion capture markers (e.g., motion capture markers affixed to the hardware components, motion capture markers affixed to targets of a motion capture sensor of the vehicle, etc.) to obtain the motion capture sensor data.

As described herein, the signal processing system can receive the motion capture sensor data from one or more motion capture sensors. The motion capture sensors may include image sensors, inertial sensors, magnetic sensors, stretch sensors, and/or mechanical motion capture sensors. For example, the motion capture sensors may include infrared sensors. The motion capture sensors may be separate from the vehicle and/or affixed to the vehicle. For example, the motion capture sensors may be implemented within a separate system (e.g., within a motion capture studio) that can interact with the vehicle. By implementing the motion capture sensors within a separate system, the motion capture sensors may interact with multiple vehicles, multiple types of vehicles, etc. The implementation of the motion capture sensors within the separate system also enables the separate calibration and maintenance of the motion capture sensors. In some embodiments, the motion capture sensors may be affixed to the vehicle. By affixing the motion capture sensors to the vehicle, the signal processing system can rapidly and efficiently obtain motion capture sensor data from the one or more motion capture sensors (e.g., without interacting with a separate system). In some cases, the hardware components of the vehicle may include one or more of the motion capture sensors. For example, the vehicle includes one or more motion capture sensors affixed to the vehicle to capture motion capture sensor data.

In some embodiments, the motion capture sensors are affixed to a separate system. For example, one or more of the motion capture sensors are affixed to a rig for identifying motion capture sensor data associated with the vehicle. In some cases, the motion capture sensors are configured within a motion capture studio. For example, the motion capture studio includes one or more motion capture sensors and vehicles can be brought in to the motion capture studio to identify motion capture sensor data associated with the hardware components of each vehicle. In some cases, the motion capture sensors include one or more motion capture sensors affixed to the vehicle and one or more motion capture sensors affixed to a separate system.

The configuration of the motion capture sensors (e.g., on the vehicle) may be customized based on the make of the vehicle, the model of the vehicle, the year of the vehicle, the type of the vehicle, any modifications to the vehicle, or any other data associated with the vehicle. For example, a truck may have a first configuration of motion capture sensors affixed to the vehicle and a motorcycle may not have motion capture sensors affixed to the motorcycle.

The motion capture sensors may generate motion capture sensor data based on one or motion capture markers. The motion capture markers may include passive motion capture markers and/or active motion capture markers. The passive motion capture markers may be coated with a particular material (e.g., a retroreflective material) that reflects generated light (e.g., reflect infrared light). The active motion capture markers may include one or more lights (e.g., light emitting diodes ("LEDs")) that generate light (e.g., emit infrared light). In some cases, the motion capture markers may reflect and/or generate non-light radiation (e.g., non-visible electromagnetic radiation). The motion capture markers may be affixed to a hardware component. For example, the motion capture markers may be affixed to the hardware component, an enclosure of the hardware component, or any other object associated with the hardware component. In some cases, the motion capture markers are removably affixed to the hardware components. For example, the motion capture markers are affixed to the hardware components using a substance and/or additional hardware components (e.g., velcro, an adhesive, a cover, screws, etc.). In some cases, the motion capture sensors do not generate motion capture sensor data based on one or more motion capture markers (e.g., the motion capture sensors are implemented within a markerless motion capture system). The motion capture sensors implemented within the markerless motion capture system may generate motion capture sensor data based on additional non-marker based data (e.g., a silhouette of the hardware components).

In some embodiments, as discussed above, the hardware components may include one or more of the motion capture sensors affixed to the vehicle. The motion capture sensors affixed to the vehicle may generate motion capture sensor data based on one or more motion capture markers affixed to a target of the motion capture sensors. The motion capture sensors affixed to the vehicle may identify a particular target (e.g., a particular object) and a motion capture marker associated with the target and may generate motion capture sensor data.

The motion capture sensors may provide the motion capture sensor data to the signal processing system. Based on the obtained motion capture sensor data, the signal processing system can determine a position of each of the hardware components of the vehicle. For example, the signal processing system determines a position of the hardware components of the vehicle relative to one or more reference positions of the vehicle. The reference positions of the vehicle may be an additional hardware component of the vehicle (e.g., a particular image sensor, a particular bracket, etc.), a particular location on the vehicle (e.g., a particular location on the roof of the vehicle, a particular location on the frame of the vehicle, etc.), etc. Each of the hardware components of the vehicle may be associated with the same or a different reference position. In some cases, the signal processing system determines a position of each of the hardware components of the vehicle relative to the vehicle.

Based on the determined position of each of the hardware components of the vehicle relative to one or more reference positions (e.g., a reference position on the vehicle, a hardware component, etc.), the signal processing system can determine whether the determined positions satisfy associated calibration thresholds. The calibration thresholds may identify a particular position relative to the one or more reference positions. The calibration thresholds may include an initial extrinsic calibration of each of the hardware components. For example, the signal processing system scans each of the hardware components of the vehicle to determine an initial extrinsic calibration of each of the hardware components (e.g., an initial position of each of the hardware components relative to the one or more reference positions). In some cases, a computing device provides (e.g., manually provide) the initial extrinsic calibration of one or more hardware components to the signal processing system. The signal processing system can compare the determined position of each of the hardware components of the vehicle (e.g., the determined positions of the hardware components relative to the one or more reference positions) to associated calibration thresholds (e.g., the initial positions of the hardware components relative to the one or more reference positions).

The signal processing system can generate hardware component alert based on comparing the determined position of each of the hardware components of the vehicle to associated calibration thresholds. For example, the hardware component alert may indicate that a hardware component does not satisfy a calibration threshold and/or that a hardware component is extrinsically calibrated. In some cases, the hardware component alert may indicate an amount of degradation of the position of the hardware component from an initial extrinsic calibration. The signal processing system can route the hardware component alert to a computing system. For example, the signal processing system routes the hardware component alert recommending the recalibration of a hardware component to a particular computing system. In some cases, the signal processing system routes the hardware component alert to a computing system to cause the automatic performance of the recalibration. For example, the signal processing system causes an automated device (e.g., a robot) to recalibrate the hardware component. In some embodiments, the signal processing system updates the calibration threshold for the hardware component based on the hardware component. For example, the signal processing system updates the calibration threshold of the hardware component to replace a previous calibration threshold if the difference between a position of the hardware component and the calibration threshold is within a particular range of movement (e.g., less than 5 millimeters, less than 5 degrees of movement, etc.) and requests recalibration of the hardware component if the difference between the position of the hardware component and the calibration threshold is outside of the particular range of movement (e.g., greater than 5 millimeters, greater than 5 degrees of movement, etc.).

Figure 5:
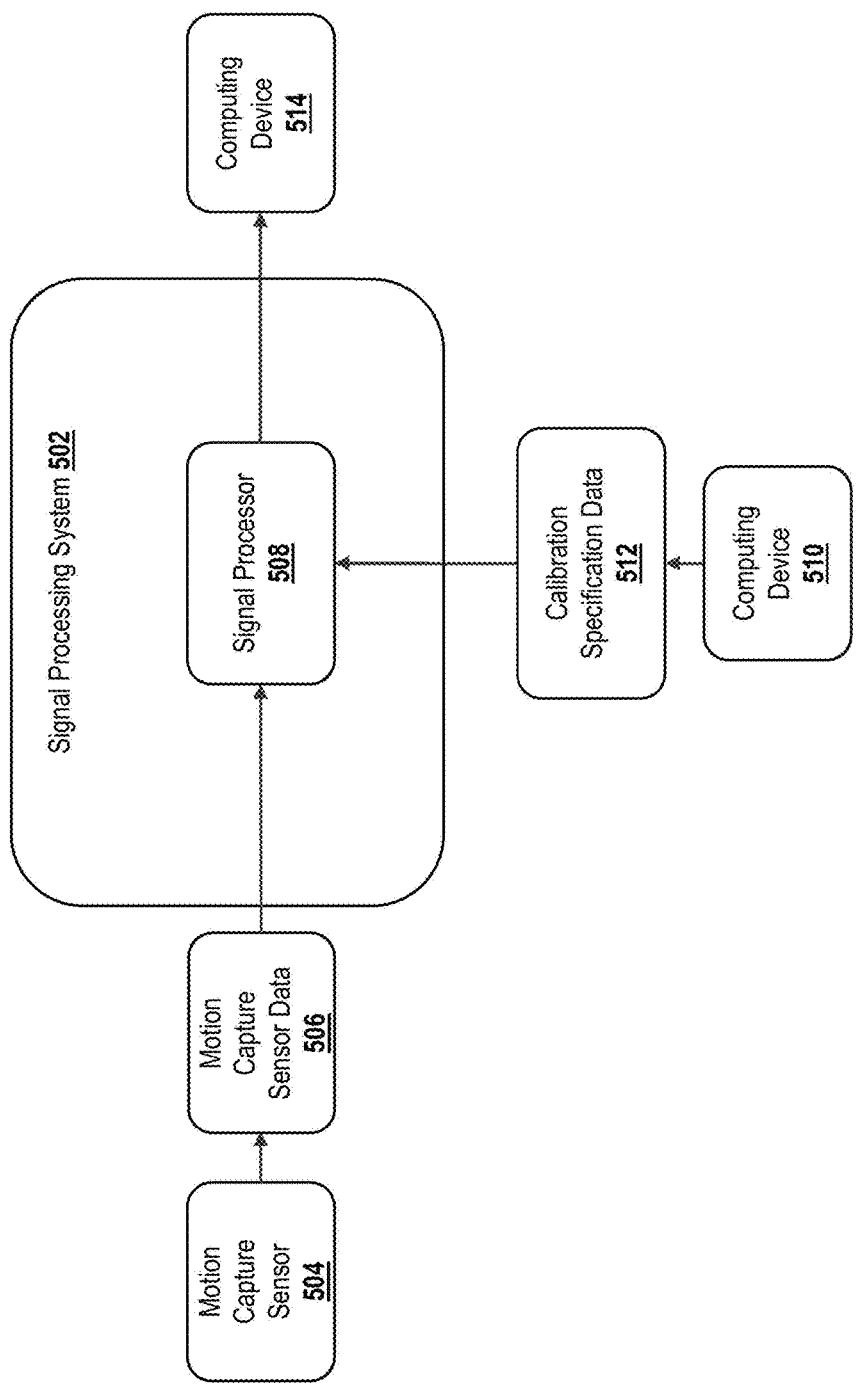
FIG. 5 is a block diagram illustrating an example of a signal processing system.

FIG. 5 is a block diagram illustrating an example of a signal processing environment 500. In the illustrated example, the signal processing environment 500 includes a signal processing system 502 communicatively coupled with a motion capture sensor 504, a computing device 510, and a computing device 514. The signal processing system 502 includes a signal processor 508. In some cases, the signal processing environment 500 and/or the signal processing system 502 form at least a part of the perception system 402, described herein at least with reference to FIG. 4. The signal processing system 502 can receive motion capture sensor data 506 associated with the motion capture sensor 504, and use the motion capture sensor data 506 to determine alert data associated with a hardware component alert. In some cases, the signal processing system 502 uses mapping data associated with a mapping of the motion capture sensor data 506 to alert data to determine which hardware component alerts to activate based on incoming motion capture sensor data 506.

The motion capture sensor 504 generates motion capture sensor data 506 and communicates the motion capture sensor data 506 to the signal processing system 502. Example of the motion capture sensor 504 includes the Vantage+ motion capture sensor produced by Vicon and the Miqus motion capture sensor produced by Qualisys. The motion capture sensor 504 can include any one or any combination of optical sensors (image sensors) (e.g., camera 202*a*, similar to that described above with reference to FIG. 2) or non-optical sensors. For example, the non-optical sensors include inertial motion sensors (e.g., accelerometers, gyroscopes, etc.), mechanical motion sensors, magnetic sensors, etc. The motion capture sensor 504 may be implemented with a vehicle associated with a hardware component (e.g., the hardware component and the motion capture sensor 504 may be affixed to the vehicle) or the motion capture sensor 504 may be implemented with a separate system (e.g., a motion capture studio).

The motion capture sensor 504 may generate motion capture sensor data 506 associated with captured motion (e.g., of a hardware component) based on one or more motion capture markers. For example, a motion capture marker may be attached to an object (e.g., a hardware component of the vehicle, a target of a motion capture sensor of the vehicle, etc.). In the example of a motion capture sensor 504 implemented with the vehicle (e.g., affixed to a hardware component of the vehicle) and a motion capture sensor affixed to a reference point of the vehicle, the motion capture marker may be affixed to a target separate from the vehicle for calibration of the hardware component. In the example of a motion capture sensor 504 implemented with a separate system, motion capture markers may be affixed at the reference point of the vehicle and affixed to the hardware component of the vehicle for calibration of the hardware component. motion capture markers (e.g., an active motion capture marker and/or a passive motion capture marker) may emit and/or reflect infrared light. The motion capture sensor 504 may generate motion capture sensor data 506 based on the infrared light associated with the motion capture markers. The motion capture sensor data 506 may identify the position of a particular motion capture marker. For example, the motion capture sensor data 506 identifies the position of a particular motion capture marker within the motion capture sensor data. The motion capture sensor 504 may generate the motion capture sensor data 506 and provide the motion capture sensor data 506 to the signal processor 508 for the calibration of a hardware component of a vehicle.

The hardware component of the vehicle may generate data (e.g., sensor data) based on intrinsic parameters (e.g., parameters associated with an intrinsic calibration of the hardware component) and extrinsic parameters (e.g., parameters associated with an extrinsic calibration of the hardware component). The intrinsic parameters may include any one or any combination of a scale factor, a focal length, a principal point (e.g., a sensor center), a skew, a geometric distortion, etc. associated with the hardware component and the extrinsic parameters may include a rotation, a translation, a position, etc. associated with the hardware component. The hardware component may utilize the intrinsic parameters to map the sensor data from three-dimensional world points to a two-dimensional image plane.

The signal processor 508 (or another computing system) may calibrate the hardware component to identify a first set of intrinsic parameters for generating the sensor data The hardware component may be calibrated based on a series of images. For example, the hardware component are calibrated using two-dimensional sensor calibration (e.g., using a particular two-dimensional pattern), three-dimensional sensor calibration, or self-calibration to identify the first set of intrinsic parameters. Based on the calibration of the hardware component, the hardware component may identify the first set of intrinsic parameters and may generate the sensor data based on the first set of intrinsic parameters.

In the illustrated example, the signal processing system 502 includes a signal processor 508 to receive the motion capture sensor data 506, however, it will be understood that the signal processing system 502 can include fewer, more, or different components. The signal processor 508 may process the motion capture sensor data 506 to determine a position of a hardware component. (e.g., a hardware component affixed to the vehicle). In some cases, the signal processor 508 processes the motion capture sensor data 506 to identify a position of the motion capture sensor 504. For example, the motion capture sensor 504 may be a hardware component affixed to the vehicle and the signal processor 508 may process the motion capture sensor data 506 to identify the position of the motion capture sensor 504.

The signal processor 508 may process the motion capture sensor data 506 to identify a position of the hardware component relative to a reference position (e.g., a reference point) of the vehicle. For example, the signal processor 508 identifies a position of the hardware component relative to a central location of the vehicle (e.g., an image sensor hub of the vehicle). To identify the reference position of the vehicle, an additional motion capture marker may be affixed to the reference position of the vehicle and the signal processor 508 may receive additional motion capture sensor data 506 associated with the additional motion capture marker affixed to the reference position of the vehicle. Therefore, the signal processor 508 may identify a position of the hardware component based on the motion capture sensor data 506 and the reference position based on the additional motion capture sensor data 506. The signal processor 508 may compare the position of the hardware component to the reference position to identify the position of the hardware component relative to the reference position. Therefore, the motion capture sensor data 506 can provide a position of the hardware component and a position of the reference position to calculate the position of the hardware component relative to the identified reference position.

In some cases, the signal processor 508 receives motion capture sensor data 506 from multiple motion capture sensors. The signal processor 508 may determine the position of a hardware component based on the motion capture sensor data 506 from the multiple motion capture sensors. For example, the signal processor 508 receives motion capture sensor data 506 from a first motion capture sensor affixed to the vehicle (e.g., a first hardware component) and motion capture sensor data 506 from a second motion capture sensor affixed to the vehicle (e.g., a reference position). The motion capture sensor data 506 from the first motion capture sensor and the motion capture sensor data 506 from the second motion capture sensor may be captured based on a motion capture marker affixed to a particular target.

Based on determining motion capture sensor data 506 from the first motion capture sensor and the motion capture sensor data 506 from the second motion capture sensor are captured based on the same motion capture marker, the signal processor 508 may utilize the motion capture sensor data 506 from the first motion capture sensor and the motion capture sensor data 506 from the second motion capture sensor to identify the position of the hardware component (the first motion capture sensor affixed to the hardware component) relative to the reference position (the second motion capture sensor affixed to the reference position). For example, the signal processor 508 determines the position of the hardware component relative to the reference position using the motion capture marker (e.g., the motion capture marker affixed to the target).

The signal processor 508 can compare the motion capture sensor data 506 with threshold data identifying values for motion capture sensor data 506. For example, the signal processor 508 determines whether the motion capture sensor data 506 satisfies the threshold data. For example, the threshold data identifies an amount of data (e.g., 5 megabytes), a type of data (e.g., motion capture sensor data), a quality of data, a time range corresponding to the data (e.g., at least one minute), or any other characteristics of the data. In some embodiments, the signal processor 508 determines whether the motion capture sensor data 506 is greater than, less than, or within a particular range of the threshold data. In some cases, if the signal processor 508 determines the motion capture sensor data 506 does not satisfy the threshold data, the signal processor 508 does not use the motion capture sensor data 506 to determine an extrinsic calibration of the hardware component and requests updated motion capture sensor data 506.

The signal processor 508 also receives calibration specification data 512 associated with one or more calibration specifications of the hardware component from a computing device 510. In some cases, the signal processor 508 receives the calibration specification data 512 from the computing device 510 and/or a data store. In some cases, the signal processor 508 parses the calibration specification data 512 to identify a subset of the calibration specification data 512 associated with a particular hardware component (e.g., based on the type of hardware component). The calibration specification data 512 may identify a particular position on the vehicle (e.g., a particular position relative to a reference position on the vehicle). The particular position identified by the calibration specification data 512 may be an initial position of the hardware component on the vehicle. In some embodiments, the particular position includes one or more acceptable positions for the hardware component on the vehicle. For example, the particular position identifies one or more positions that the hardware component can be located at on the vehicle while being considered extrinsically calibrated. In some cases, the calibration specification data 512 identifies a range of positions on the vehicle (e.g., a particular range of positions relative to a reference position on the vehicle). For example, the calibration specification data 512 identifies a range of acceptable positions on the vehicle for the hardware component.

The calibration specification data 512 may include an initial extrinsic calibration associated with the hardware component. For example, the signal processing system 502 generates calibration specification data 512 that includes an initial extrinsic calibration associated with the hardware component by scanning the position of the hardware component (e.g., at an initial time period). The calibration specification data 512 may be based on a confirmation that the hardware component is in an acceptable position. For example, the calibration specification data 512 may be generated based on the hardware component being initially affixed to the vehicle and identifies a position of the hardware component prior to any degradation. The signal processing system 502 may utilize the calibration specification data 512 as ground truth data. For example, the signal processing system 502 identifies whether the hardware component is extrinsically calibrated (e.g., is positioned at the initial position) using the calibration specification data 512.

The signal processing system 502 may receive the calibration specification data 512 as initial motion capture sensor data associated with the hardware component. Based on the initial motion capture sensor data, the signal processing system 502 may determine an initial position of the hardware component relative to the reference point. In some cases, the signal processing system 502 determines the initial motion capture sensor data identifies an initial extrinsic calibration of the hardware component based on a prompt received via a computing device. For example, the computing device provides instructions to the signal processing system 502 indicating that the received motion capture sensor data identifies an initial extrinsic calibration of the hardware component. Based on the received initial motion capture sensor data, the signal processing system 502 can determine the initial extrinsic calibration associated with the hardware component and store the initial extrinsic calibration as calibration specification data 512. In some cases, the signal processing system 502 routes the calibration specification data 512 to a separate computing device (e.g., computing device 510).

Further, the signal processor 508 can compare the position (e.g., an updated position subsequent to an initial position) of the hardware component relative to a reference point (e.g., based on updated motion capture sensor data 506) with the initial position of the hardware component relative to the reference point). For example, the signal processor 508 compares the position of the hardware component relative to the reference point with an initial position of the hardware component relative to the reference point identified by the calibration specification data 512.

In some embodiments, the signal processing system 502 does not identify initial motion capture sensor data. The signal processing system 502 may receive the calibration specification data 512 separately from the computing device 510 and/or a data store without identifying the initial motion capture sensor data. For example, the calibration specification data 512 may be determined based on a series of measurements and provided to the signal processing system 502. The signal processor 508 can compare the position of the hardware component with the calibration specification data 512, the signal processor 508 can determine whether the position of the hardware component satisfies the calibration specification data 512. For example, the signal processor 508 determines whether values identifying the position of the hardware component satisfy a threshold (e.g., a threshold value) associated with the calibration specification data 512. For example, the threshold identifies a particular position relative to the reference point (e.g., within 5 millimeters of the reference point. In some embodiments, the signal processor 508 determines whether the values identifying the position of the hardware component are greater than a threshold of the calibration specification data 512 (e.g., where the calibration specification data 512 includes a minimum value) and/or are less than a threshold of the calibration specification data 512 (e.g., where the calibration specification data 512 includes a maximum value). Accordingly, the signal processor 508 can determine whether the values identifying the position of the hardware component satisfies the calibration specification data 512 (e.g., matches a value of the calibration specification data 512, satisfies a threshold or range of the calibration specification data 512, etc.).

Based on comparing the values identifying the position of the hardware component with the calibration specification data 512, the signal processor 508 may identify a difference between the values identifying the position of the hardware component and the calibration specification data 512. In some cases, the signal processor 508 identifies an amount of difference between the values identifying the position of the hardware component and the calibration specification data 512 (e.g., the quantifiable amount by which the position of the hardware component and the calibration specification data 512 differ).

The signal processor 508 may further obtain alert mapping data. For example, the signal processor 508 may obtain alert mapping data from a computing device (e.g., a user computing device) and/or a data store. For example, the computing device may generate the alert mapping data and provide the alert mapping data to the signal processor 508. In some embodiments, the alert mapping data is user specific and/or hardware component specific alert mapping data. Each mapping of the alert mapping data may identify a difference between a position of the hardware component and calibration specification data 512 mapped to a particular hardware component alert. Each mapping of the alert mapping data may also identify a particular hardware component alert mapped to particular alert data. In some cases, each mapping of the alert mapping data identifies a difference between a position of the hardware component and calibration specification data 512 mapped to particular alert data.

Based on identifying alert data using the alert mapping data, the signal processor 508 may determine that a user should be notified of the hardware component alert. In some cases, the signal processor 508 uses alert mapping data associated with a mapping of the difference between the position of the hardware component and the calibration specification data 512 to alert data to determine the alert data to output to the computing device 514. In some cases, the alert data identifies an amount of repositioning to be performed for the hardware component. Further, the alert data may identify a degradation from the initial extrinsic calibration of the hardware component to the position of the hardware component. Accordingly, the signal processor 508 can provide the alert data to the computing device 514.

The alert data may include a recommendation (e.g., an instruction) for a user to perform further extrinsic calibration and/or testing of the hardware component. For example, the alert data may include a recommendation for a user to perform manual extrinsic calibration of the hardware component. Further, the signal processor 508 may cause the hardware component to be routed for additional extrinsic calibration. For example, the signal processor 508 may send the alert data to a robot to activate the robot. The signal processor 508 may activate the robot to cause the robot to transport the hardware component for extrinsic calibration. In some cases, the signal processor 508 activates the robot to cause the robot to extrinsically calibrate the hardware component.

In some cases, the signal processor 508 may cause the computing device 514 to update the calibration specification data 512 for the hardware component based on sending the alert data to the computing device 514. Further, in response to receiving the alert data, the computing device 512 may automatically update the calibration specification data 512. The signal processor 508 may update (e.g., automatically update) the calibration specification data 512 based on the motion capture sensor data 506 to account for degradations in the position of the hardware component. The signal processor 508 may update the calibration specification data 512 by replacing the calibration specification data with data identifying the position of the hardware component relative to the reference point identified by the motion capture sensor data 506. In some cases, the signal processor updates the calibration specification data 512 if the position of the hardware component relative to the reference point identified by the motion capture sensor data 506 is within a particular range (e.g., one millimeter) of a position of the hardware component relative to the reference point identified by the calibration specification data 512. By updating the calibration specification data 512, the signal processor 508 may adjust sensor data generated by the hardware component to account for degradations in the position of the hardware component. As the signal processor 508 can adjust the sensor data to account for the degradations, the use of such a system can enable the continued use of the vehicle without reduction in safety and/or manual adjustment. Instead, the signal processor 508 may update the position of the hardware component identified by the calibration specification data 512 and used to generate the sensor data based on a new position of the hardware component.

Example Motion Capture Sensor Configurations

Figure 6:
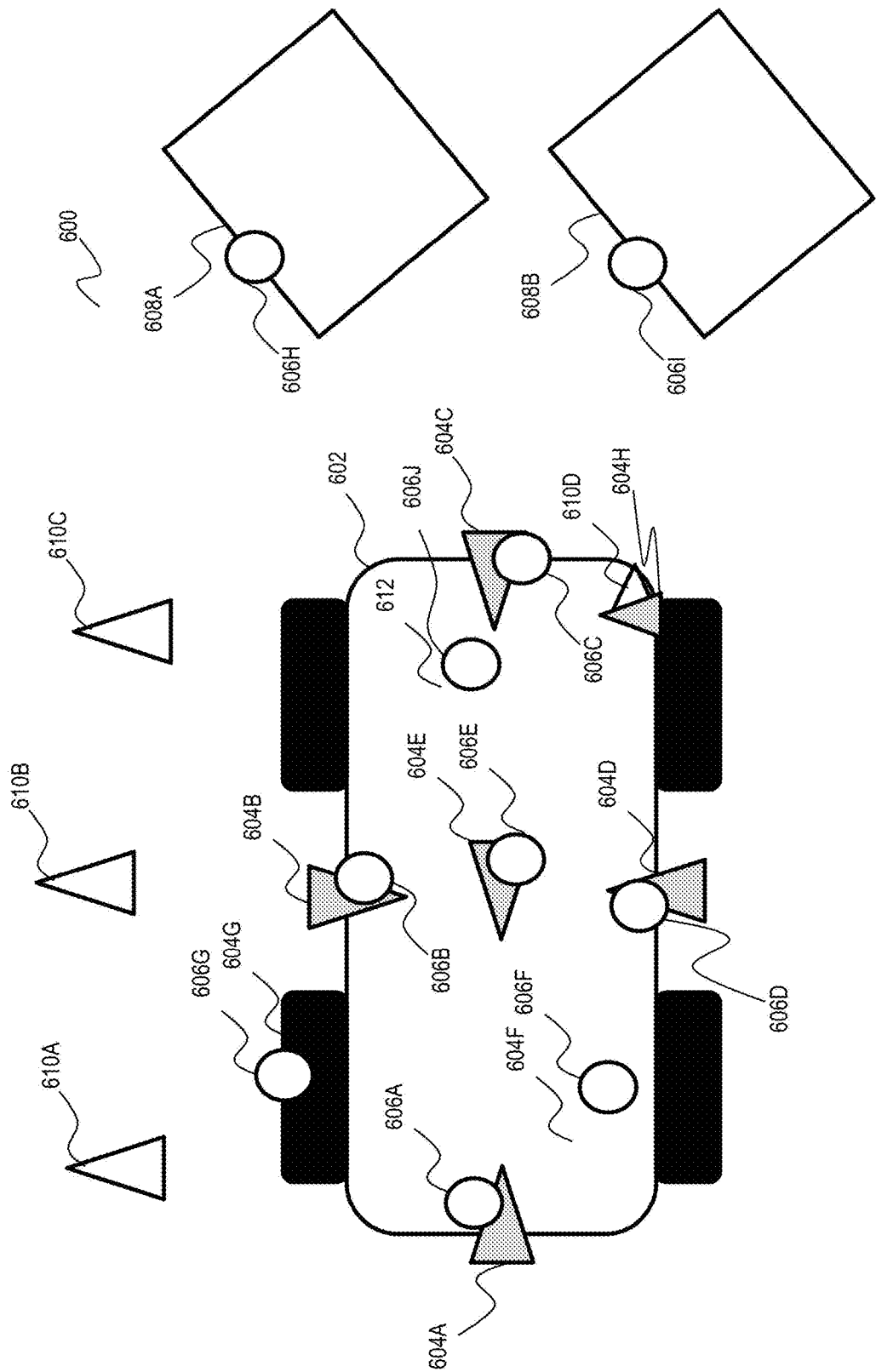
FIG. 6 is an example environment in which one or more motion capture sensors and a vehicle including one or more hardware components can be implemented.

FIG. 6 is a diagram 600 illustrating an example of a vehicle 602 with a plurality of hardware components, a plurality of motion capture sensors, and a plurality of motion capture markers. For example, the diagram 600 includes a plurality of hardware components that are each affixed to the vehicle 602 and each have a particular extrinsic calibration relative to a reference point 612 of the vehicle 602. A motion capture sensor of a first set motion capture sensors may be located with each of the plurality of hardware components. The diagram 600 further includes a second set of motion capture sensors separate from the vehicle 602. Each of the first set of motion capture sensors and the second set of motion capture sensors may generate motion capture sensor data based on motion capture markers. For example, the diagram 600 includes a plurality of motion capture markers (e.g., motion capture markers affixed to the hardware components of the vehicle 602, motion capture markers affixed to targets of the motion capture sensors, etc.). The plurality of motion capture markers can include removable and non-removable motion capture markers. For example, the removable motion capture markers includes motion capture markers that are temporarily affixed to a particular hardware component and the non-removable motion capture markers includes motion capture markers that are permanently affixed to a particular hardware component.

The reference point 612 of the vehicle 602 can be a hardware component of the vehicle 602, the vehicle 602 itself, or any portion of the vehicle 602. In some embodiments, the reference point 612 is not located on the vehicle 602 and can be located apart from the vehicle. The vehicle 602 may include a plurality of reference points. For example, the vehicle 602 includes a reference point for each hardware component. The reference point 612 of the vehicle can include a motion capture marker 606J affixed to the reference point.

A system (e.g., a system that is the same as, or similar to, the perception system 402 as described in FIG. 4, the signal processing system 502 as described in FIG. 5, and/or the like) may identify motion capture sensor data associated with each of the first set of motion capture sensors and the second set of motion capture sensors. Each of the first set of motion capture sensors and the second set of motion capture sensors may generate motion capture sensors based on a corresponding motion capture marker of the plurality of motion capture markers. The motion capture sensor data may include motion capture sensor data identifying a position of the reference point 612 on the vehicle 602 and motion capture sensor data identifying a position of each of the hardware components. Based on the motion capture sensor data, the system may identify a position of each of hardware components relative to the reference point 612 on the vehicle 602. Based on the motion capture sensor data, the system may identify the position of each of the plurality of hardware components relative to the reference point 612 of the vehicle 602.

The system may determine an initial extrinsic calibration of each of the hardware components of the vehicle 602. For example, the system determines an initial position of each of the hardware components relative to a reference point 612 of the vehicle 602. The system may determine the initial extrinsic calibration based on received motion capture sensor data.

For hardware components with motion capture markers permanently affixed to the hardware components, the system may identify the initial position of each of the hardware components by capturing motion capture sensor data upon the integration of the motion capture markers and the hardware components. For hardware components with motion capture markers temporarily affixed to the hardware components, the system may identify the initial position of each of the hardware components by receiving calibration data (e.g., from a computing device). The motion capture sensor data may include motion capture sensor data identifying a position of the reference point 612 on the vehicle 602 and motion capture sensor data identifying a position of each of the hardware components. Based on the motion capture sensor data, the system may identify a position of each of hardware components relative to the reference point 612 on the vehicle 602.

Based on the initial extrinsic calibration of each of the hardware components, the system may obtain calibration specification data for each of the hardware components. The system may compare the calibration specification data with a position of each of the hardware components based on the motion capture sensor data to determine whether a degradation of the position of the hardware components has occurred. For example, the system identifies whether a degradation of the position of the hardware components has occurred and/or an amount of the degradation.

The system may generate hardware component alerts based on identifying whether the degradation of the position of the hardware components has occurred and/or and amount of the degradation. The system may route the hardware component alerts (e.g., alert data associated with the hardware component alerts) to identify the hardware components for recalibration.

In the example of FIG. 6, the plurality of hardware components includes hardware components associated with the vehicle 602. The plurality of hardware components may include any components of the vehicle 602. For example, the plurality of hardware components includes one or more of a camera image sensor, a lidar sensor, a radar sensor, a pressure sensor, an attachment to the vehicle 602, a tire of the vehicle 602, a tire rim of the vehicle 602, a handle of the vehicle 602, a mirror of the vehicle 602, a panel of the vehicle 602, a window of the vehicle 602, a door of the vehicle 602, a trunk of the vehicle 602, a hood of the vehicle 602, a sun roof of the vehicle 602, a lock of the vehicle 602, or a component enclosed within the vehicle 602.

The plurality of hardware components may include exterior components of the vehicle 602 (e.g., components located on the exterior of the vehicle 602) and interior components of the vehicle 602 (e.g., components located interior to the vehicle 602). For example, the plurality of hardware components includes an image sensor located on the roof of the vehicle 602 and/or a radar image sensor located interior to the vehicle 602.

As a non-limiting example, the plurality of hardware components includes a first hardware component 604A, a second hardware component 604B, a third hardware component 604C, a fourth hardware component 604D, a fifth hardware component 604E, a sixth hardware component 604F, a seventh hardware component 604G, and an eighth hardware component 604H. The first hardware component 604A is a first image sensor. The second hardware component 604B is a second image sensor. The third hardware component 604C is a third image sensor. The fourth hardware component 604D is a fourth image sensor. The fifth hardware component 604E is a fifth image sensor. The sixth hardware component 604F is a component of the roof of the vehicle 602 (e.g., a latch, a handle, an antenna, etc.). The seventh hardware component 604G is a rim of the vehicle 602. The eighth hardware component 604H is a component located interior to the vehicle 602 (e.g., a radar image sensor located interior to the vehicle 602).

Each of the plurality of hardware components may be associated with one or more motion capture markers (e.g., the motion capture markers can be affixed to the hardware components). Each of the plurality of hardware components may be co-located with one or more motion capture sensors to identify a position of the hardware components. For hardware components with motion capture markers affixed to the hardware components, motion capture sensors located externally and/or separate from the vehicle 602 may capture motion capture sensor data based on the motion capture markers affixed to the hardware components and the motion capture marker 606J affixed to the reference point 612 on the vehicle 602. For hardware components without motion capture markers affixed to the hardware components (e.g., image sensors located interior to a shell of a vehicle 602), the system may utilize motion capture sensors co-located to the hardware components to capture motion sensor data based on motion capture markers affixed to a target of a motion capture sensor of the vehicle.

In the example of FIG. 6, the first set of motion capture sensors includes motion capture sensors associated with the vehicle 602. Each of the first set of motion capture sensors is affixed to the vehicle 602 and co-located to hardware components. In some cases, each of the first set of motion capture sensors are located within an interior of the vehicle 602.

As a non-limiting example, the first set of motion capture sensors includes a first motion capture sensor 610D co-located to the eighth hardware component 604H. The first motion capture sensor 610D may be located interior to the vehicle 602 and may capture motion capture sensor data.

In the example of FIG. 6, the second set of motion capture sensors includes motion capture sensors located separately from the vehicle 602. Each of the second set of motion capture sensors may be external to the vehicle 602. For example, each of the second set of motion capture sensors is located within a motion capture system and/or a motion capture studio.

As a non-limiting example, the second set of motion capture sensors includes a first motion capture sensor 610A, a second motion capture sensor 610B, and a third motion capture sensor 610C. In some cases, one or more of the second set of motion capture sensors is located on the vehicle 602. For example, a motion capture sensor is affixed to the vehicle 602 to generate motion capture sensor data associated with a different hardware component of the vehicle 602.

Each of the first set of motion capture sensors and the second set of motion capture sensors may be an image sensor. The first set of motion capture sensors and the second set of motion capture sensors may generate motion capture sensor data based on motion capture markers. The one or more motion capture sensors may utilize the one or more motion capture markers to identify motion capture sensor data associated with each of the plurality of hardware components. The system may identify a position of each of the plurality of hardware components using received motion capture sensor data. The motion capture markers may be distributed throughout an environment of the vehicle 602.

The motion capture markers may be active motion capture markers and/or passive motion capture markers. For example, the active motion capture markers emit infrared light and the passive motion capture markers reflect infrared light. The motion capture markers may be affixed to the hardware components of the vehicle 602 and/or targets of the motion capture sensor of the vehicle 602.

In the example of FIG. 6, the motion capture markers includes a first motion capture marker 606A, a second motion capture marker 606B, a third motion capture marker 606C, a fourth motion capture marker 606D, a fifth motion capture marker 606E, a sixth motion capture marker 606F, a seventh motion capture marker 606G, an eighth motion capture marker 606H, and a ninth motion capture marker 606I. The first motion capture marker 606A is affixed to the first hardware component 604A. The second motion capture marker 606B is affixed to the second motion hardware component 604B. The third motion capture marker 606C is affixed to the third hardware component 604C. The fourth motion capture marker 606D is affixed to the fourth hardware component 604D. The fifth motion capture marker 606E is affixed to the fifth hardware component 604E. The sixth motion capture marker 606F is affixed to the sixth hardware component 604F. The seventh motion capture marker 606G is affixed to the seventh hardware component 604G. The eighth motion capture marker 606H is affixed to a first target 608A of the eighth hardware component 604H and the ninth motion capture marker 606I is affixed to a second target 608B of the eight hardware component 604H.

The first motion capture sensor 610D may perform target-based calibration using the eighth motion capture marker 606H affixed to the first target 608A and/or the ninth motion capture marker 606I affixed to the second target 608B. In some embodiments, the first motion capture sensor 610D may perform target-based calibration based on one of the first target 608A or the second target 608B. The first motion capture sensor 610D may identify the first target 608A and/or the second target 608B using the eighth motion capture marker 606H and the ninth motion capture marker 606I. The first motion capture sensor 610D may capture motion capture sensor data associated with the first target 608A and/or the second target 608B. Based on the sensor data, a system may determine a pose of the first motion capture sensor 610D and determine a position of the first motion capture sensor 610D. The system may use the position of the first motion capture sensor 610D to determine a position of the eight hardware component 604H relative to the reference point 612 on the vehicle 602. In some cases, to determine the position of the eighth hardware component 604H relative to the reference point on the vehicle 602, the system compares the motion capture sensor data from the first motion capture sensor 610D with motion capture sensor data from another motion capture sensor (e.g., a motion capture sensor affixed to the reference point 612 on the vehicle 602, affixed to the vehicle 602, or co-located to another hardware component of the vehicle 602).

It will be understood that while FIG. 6 refers to particular configurations and locations of motion capture markers, motion capture sensors, and hardware components, more, less, or different types of configurations and locations can be used. For example, the second set of motion capture sensors can be located on each side of the vehicle 602.

Example Motion Capture Markers

Figure 7:
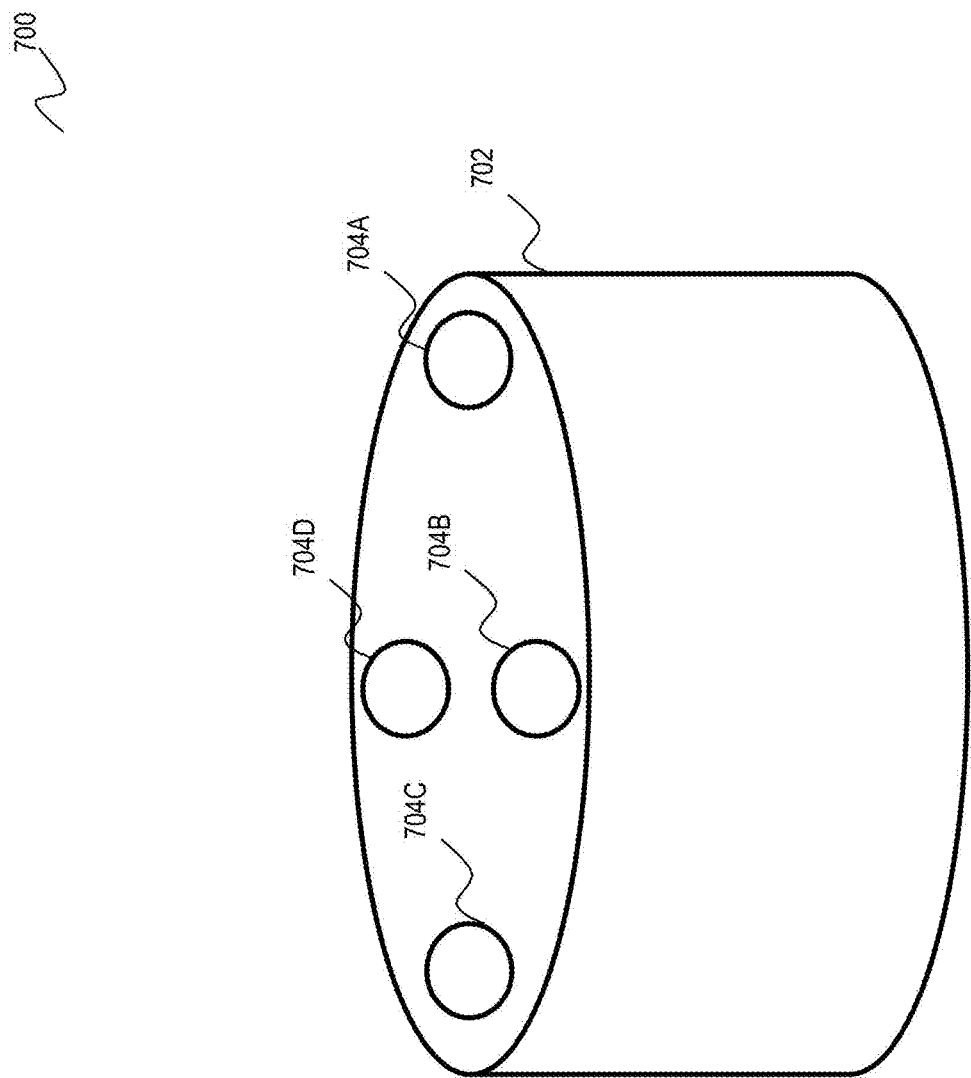
FIG. 7 is a diagram illustrating an example hardware component and one or more motion capture markers.

FIG. 7 illustrates an example environment 700 including an example component 702 and one or more motion capture markers 704A, 704B, 704C, and 704D. The one or more motion capture markers 704A, 704B, 704C, and 704D may emit and/or reflect light (e.g., infrared light). In some cases, the motion capture markers 704A, 704B, 704C, and 704D emit and/or reflect radiation (e.g., electromagnetic radiation). The component 702 may be located on a vehicle. For example, the vehicle includes one or more of the components to emit and/or reflect light. One or more motion capture sensors may obtain motion capture sensor data based on the component 702 and the one or more motion capture markers 704A, 704B, 704C, and 704D.

In the illustrated example of FIG. 7, the environment 700 includes a component 702. The component 702 may be a hardware component associated with a vehicle. For example, the component 702 is an image sensor affixed to the vehicle.

In some cases, the component 702 is affixed to a hardware component associated with the vehicle. The component 702 may be a shell (e.g., a casing, a cover, a hat, etc.) that interacts with the hardware component. For example, the component 702 can be placed over the hardware component of the vehicle. The component 702 may be affixed to the hardware component and may not be removable from the hardware component.

The component 702 can interact with the hardware component in a single configuration. Based on the interaction, the component 702 may lock into place with the hardware component. For example, the component 702 can lock into place with the hardware component in a single configuration. Based on the component, interacting with the hardware component in a single configuration, a system may identify an initial position of the component 702 and the one or more motion capture markers 704A, 704B, 704C, and 704D relative to the vehicle and/or the hardware component.

The component 702 may include a clear screen to enable the operation of the hardware component. For example, the component 702 can include a clear screen (e.g., a transparent screen) such that when the component 702 is placed over an image sensor of the vehicle, the image sensor can generate sensor data associated with an environment of the vehicle.

The component 702 may include the one or more motion capture markers 704A, 704B, 704C, and 704D. In some embodiments, each of the one or more motion capture markers 704A, 704B, 704C, and 704D is not aligned collinearly on the component 702. It will be understood that the component 702 may include more, less, or different motion capture markers.

The one or more motion capture markers 704A, 704B, 704C, and 704D may include active motion capture markers and/or passive motion capture markers. Each of the one or more motion capture markers 704A, 704B, 704C, and 704D may reflect and/or emit light. In some embodiments, a portion of the one or more motion capture markers 704A, 704B, 704C, and 704D are active motion capture markers and another portion of the one or more motion capture markers 704A, 704B, 704C, and 704D are passive motion capture markers. Further, motion capture markers associated with a first component may be passive motion capture markers and motion capture markers associated with a second component may be active motion capture markers.

The one or more motion capture markers 704A, 704B, 704C, and 704D may be integrated with the component 702. For example, the one or more motion capture markers 704A, 704B, 704C, and 704D are permanently affixed to the component 702. In some cases, the one or more motion capture markers 704A, 704B, 704C, and 704D are integrated with a hardware component of the vehicle. A system may identify a relative position of each of the one or more motion capture markers 704A, 704B, 704C, and 704D integrated with the component 702 based on the integration of the motion capture marker with the component 702. The system can determine a calibration specification threshold based on the relative position of each of the one or more motion capture markers 704A, 704B, 704C, and 704D.

In some cases, the one or more motion capture markers 704A, 704B, 704C, and 704D are temporarily affixed to the component 702. For example, the one or more motion capture markers 704A, 704B, 704C, and 704D include one or more motion capture marker stickers. The motion capture marker stickers may be removable from the component 702. For example, each of the one or more motion capture markers 704A, 704B, 704C, and 704D are affixed in a first location at a first time and affixed in a second location at a second time. A system may receive a calibration specification threshold based on a positioning of the one or more motion capture markers 704A, 704B, 704C, and 704D relative to the component 702 and/or the vehicle. As the position of each of the one or more motion capture markers 704A, 704B, 704C, and 704D can change, the system can subsequently receive an updated calibration specification threshold.

The one or more motion capture markers 704A, 704B, 704C, and 704D may produce (e.g., reflect, emit, etc.) light. A motion capture sensor may identify the provided light and may generate motion capture sensor data. The motion capture sensor may obtain provided light from multiple motion capture markers associated with a particular hardware component. For example, each of the one or more motion capture markers 704A, 704B, 704C, and 704D provide light to the motion capture sensor. Based on the motion capture sensor data, a system may identify that a position of the hardware component associated with the one or more motion capture markers 704A, 704B, 704C, and 704D. For example, the component 702 can be placed on a hardware component and the system identifies a position of the hardware component relative to a vehicle and/or a component of the vehicle based on the one or more motion capture markers 704A, 704B, 704C, and 704D.

Example Flow Diagram of Data Processor

Figure 8:
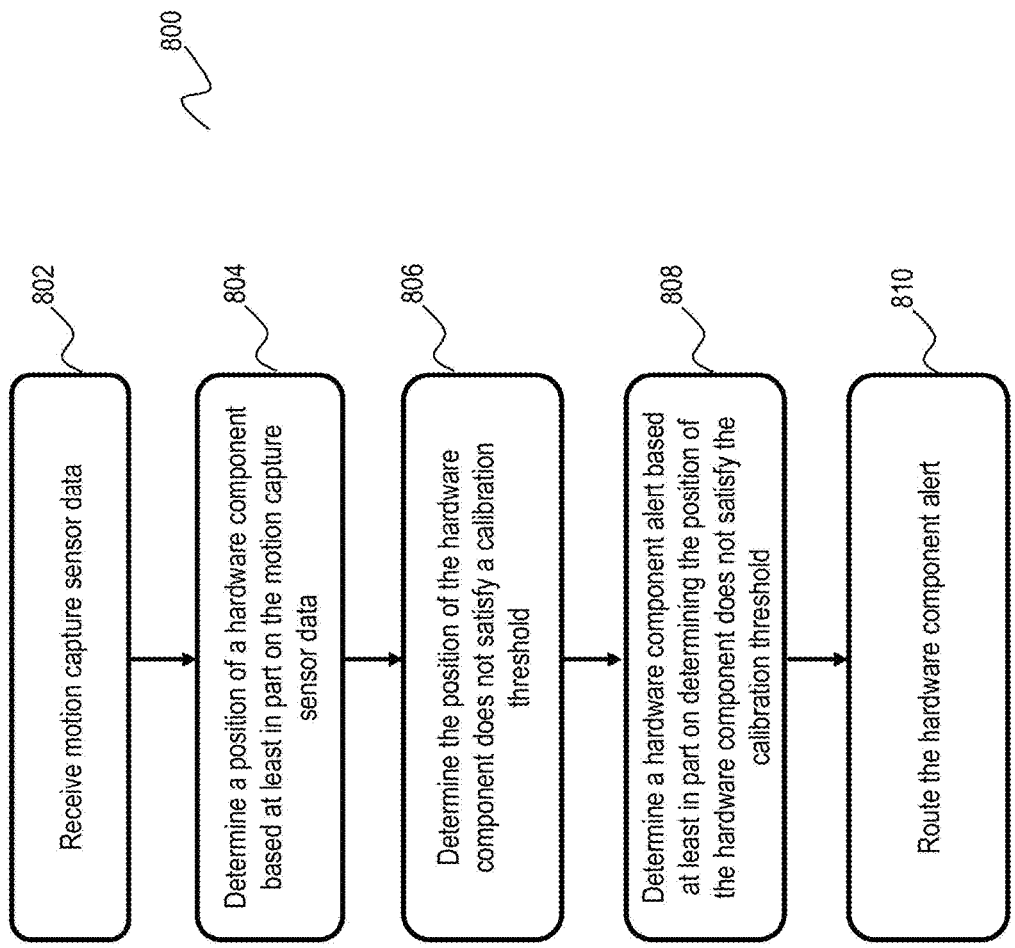
FIG. 8 is a flow diagram illustrating an example of a routine implemented by one or more processors to determine a hardware component alert based on the extrinsic calibration of a hardware component.

FIG. 8 is a flow diagram illustrating an example of a routine 800 implemented by one or more processors (e.g., one or more processors of the signal processing system 502). The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 802, the signal processing system 502 receives motion capture sensor data. The signal processing system 502 can obtain the motion capture sensor data from a motion capture sensor. For example, the motion capture sensor generates the motion capture sensor data and routes the motion capture sensor data to the signal processing system 502. In some cases, the signal processing system 502 receives motion capture sensor data from multiple motion capture sensors. For example, the signal processing system 502 receives motion capture sensor data from a first motion capture sensor and a second motion capture sensor to identify a position of a hardware component of a vehicle relative to a reference point of the vehicle. In some embodiments, the signal processing system 502 receives motion capture sensor data from multiple motion capture sensors to identify a position of multiple hardware components of a vehicle relative to the reference point of the vehicle.

The motion capture sensor may generate motion capture sensor data based on one or more motion capture markers. Each of the one or more motion capture markers may be active or passive infrared motion capture markers. The active infrared motion capture markers may emit infrared light and the passive infrared motion capture markers may reflect infrared light. The motion capture sensor data may include a location of the one or more motion capture markers and a location of a reference position (e.g., a reference point) of the vehicle.

The motion capture markers may be affixed to the hardware component (e.g., temporarily affixed or permanently affixed to the hardware components). For example, the motion capture markers may be affixed to the hardware component in a fixed position. In some cases, the motion capture marker may be affixed to an enclosure (e.g., a housing, a hat, a cover, etc.) associated with the hardware component. For example, the motion capture marker may be affixed to an enclosure that is placed over the hardware component. In some cases, the enclosure mates with the hardware component in a fixed position (e.g., a single position).

In some cases, the motion capture markers may be temporarily affixed to the hardware component. For example, the motion capture markers may be removable motion capture markers (e.g., motion capture stickers). In some cases, the removable motion capture markers may be affixed to the hardware component in any of a plurality of positions.

In some cases, the motion capture markers may be affixed to a target of the hardware component. For example, a motion capture sensor may be located with the hardware component and the motion capture markers may be affixed to target of the motion capture sensor. In some cases, the target includes a display with a particular pattern (e.g., a checkerboard pattern). The motion capture sensor may capture an image of the target (and the motion capture marker affixed to the target) and determine the motion capture sensor data. In some cases, the motion capture sensor data includes the image of the target. A system may compare the motion capture sensor data from the motion capture sensor with motion capture sensor data from another motion capture sensor (e.g., a motion capture sensor affixed to the reference point of the vehicle) to determine a position of the hardware component relative to the reference point of the vehicle.

In some embodiments, motion capture markers may be affixed to a first hardware component of the vehicle and motion capture markers may be affixed to a target of a second motion capture sensor of the vehicle. The signal processing system 502 may simultaneously or separately calibrate the first hardware component of the vehicle and the second hardware component of the vehicle.

The hardware component may include any components of the vehicle. The hardware component may include electrical and non-electrical components of the vehicle. For example, the hardware components may include a camera image sensor, a lidar sensor, a radar sensor, a pressure sensor, an attachment to the vehicle, a tire of the vehicle, a tire rim of the vehicle, a handle of the vehicle, a mirror of the vehicle, a panel of the vehicle, a window of the vehicle, a door of the vehicle, a trunk of the vehicle, a hood of the vehicle, a sun roof of the vehicle, a lock of the vehicle, a component enclosed within the vehicle, or any other component of the vehicle.

In some cases, the hardware component may be enclosed within the vehicle. For example, the hardware component may be enclosed within a shell, a frame, or any other component of the vehicle.

At block 804, the signal processing system 502 determines a position of a hardware component based at least in part on the motion capture sensor data. The signal processing system 502 may determine the position of the hardware component on the vehicle relative to the reference point on the vehicle. The reference point on the vehicle may be the vehicle itself, an additional hardware component associated with the vehicle, or any other point on the vehicle. In some cases, the signal processing system 502 determines the position of the hardware component by determining the extrinsic calibration of the hardware component (e.g., by determining whether the hardware component is extrinsically calibrated).

The signal processing system 502 may determine the position of the hardware component based on a relationship between the hardware component and a reference point. The signal processing system 502 may identify a relationship between the position of the hardware component and the position of the reference point. The signal processing system 502 may use the identified relationship to determine the position of the hardware component relative to the reference point on the vehicle.

For hardware components with motion capture markers affixed (permanently or temporarily) to the hardware component or an enclosure of the hardware component, the signal processing system 502 may determine the position of the hardware component based on the motion capture markers affixed to the hardware component (or the enclosure of the hardware component) and motion capture markers affixed to the reference point of the vehicle. Therefore, the signal processing system 502 can compare the position of the motion capture markers with a position (e.g., a known position) of the reference point of the vehicle.

For target-based calibration, the motion capture markers may be affixed to targets. The signal processing system 502 may identify the position of the hardware component relative to the reference point of the vehicle by comparing the motion capture sensor data with motion capture sensor data from a motion capture sensor affixed to a reference point on the vehicle.

At block 806, the signal processing system 502 determines the position of the hardware component does not satisfy a calibration threshold. The calibration threshold may be associated with the hardware component. For example, the signal processing system 502 receives the calibration threshold from a computing device. Further, the computing device can indicate the calibration threshold is associated with the particular hardware component.

The calibration threshold may identify a particular location or position on the vehicle relative to the reference point on the vehicle. In some cases, the calibration threshold identifies a particular range of locations or positions on the vehicle. The calibration threshold may include data identifying the particular location or position. For example, the calibration threshold may include a plurality of coordinates (e.g., x, y coordinates) identifying the particular location or position.

For hardware components with motion capture markers permanently affixed to the hardware component or an enclosure of the hardware component, the signal processing system 502 may identify the calibration threshold using initial motion capture sensor data. The signal processing system 502 may receive the initial motion capture sensor data associated with the motion capture sensors. The signal processing system 502 may determine an initial position of the hardware component based on the initial motion capture sensor data. The signal processing system 502 may determine the calibration threshold based on the initial position of the hardware component.

For hardware components with motion capture markers temporarily affixed to the hardware component or an enclosure of the hardware component and/or for target-based calibration, the signal processing system 502 may identify the calibration threshold using a provided input. The signal processing system 502 may receive the calibration threshold from a computing device as input. For example, the computing device may provide the calibration threshold to the signal processing system 502 as a manual calibration threshold.

In some embodiments, the signal processing system 502 may determine the position of the hardware component satisfies the calibration threshold. For example, the signal processing system 502 determines the position of the hardware component matches a location or is within a range identified by the calibration threshold.

At block 808, the signal processing system 502 determines a hardware component alert based at least in part on determining the position of the hardware component does not satisfy the calibration threshold. The hardware component alert may be associated with the hardware component. For example, the signal processing system 502 generates the hardware component alert and links the hardware component alert to the hardware component.

The hardware component alert may identify whether a hardware component is extrinsically calibrated or is not extrinsically calibrated (e.g., whether the hardware component is in a correct position identified by the calibration threshold). Further, the hardware component alert may identify a deviation of the position of the hardware component from a location or position identified by the calibration threshold. For example, the hardware component alert may identify the deviation in any unit of measurement (e.g., inches, feet, millimeters, centimeters, meters, etc.).

At block 810, the signal processing system 502 routes the hardware component alert. The signal processing system 502 can route the hardware component alert to a computing device. Further, the signal processing system 502 can cause the computing device to display an indication of the hardware component alert.

In some cases, the signal processing system 502 may route the hardware component alert to a robotic device. By routing the hardware component alert to the robotic device, the signal processing system 502 may cause the robotic device to route the vehicle (or the hardware component) for extrinsic calibration (e.g., recalibration).

In some cases, by routing the hardware component alert to the robotic device, the signal processing system 502 may cause the robotic device to extrinsically calibrate the hardware component using the hardware component (e.g., based on an identified deviation). The robotic device may extrinsically calibrate the hardware component by returning the hardware component to a location or position identified by the calibration threshold. For example, the signal processing system 502 may cause the robotic device to adjust the hardware component from a first position of the hardware component to a second position of the hardware component. Subsequently to causing the robotic device to adjust the hardware component, the signal processing system 502 may receive sensor data associated with the hardware component. The signal processing system 502 may utilize the received sensor data based on determining the hardware component has been extrinsically calibrated. In some cases, the signal processing system 502 may update the calibration threshold. The updated calibration threshold may identify a position of the hardware component identified by the motion capture sensor data. For example, the signal processing system 502 updates the calibration threshold based on determining the position of the hardware component relative to the reference point is within a particular range of a position identified by the calibration threshold.

It will be understood that the routine 800 can be repeated multiple times using different motion capture sensor data. In some cases, the signal processing system 502 iteratively repeats the routine 800 for multiple sets of motion capture sensor data that are received from multiple motion capture sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
    receiving, using at least one processor, motion capture sensor data from a motion capture sensor, the motion capture sensor data associated with at least a location of a motion capture marker and a location of a reference point on a vehicle;
    determining, using the at least one processor, a position of a hardware component associated with the vehicle relative to the reference point on the vehicle based at least in part on the at least the location of the motion capture marker and the location of the reference point on the vehicle;
    determining, using the at least one processor, the position of the hardware component does not satisfy a calibration threshold associated with the hardware component;
    determining, using the at least one processor, a hardware component alert associated with the hardware component based at least in part on determining that the position of the hardware component does not satisfy the calibration threshold associated with the hardware component; and
    routing, using the at least one processor, the hardware component alert to a computing device, wherein the position of the hardware component is calibrated based at least in part on routing the hardware component alert to the computing device.

2. The method of claim 1, wherein routing the hardware component alert to the computing device comprises routing the hardware component alert to a robotic device, the method further comprising:
    causing the robotic device to calibrate the hardware component based at least in part on the hardware component alert.

3. The method of claim 1, wherein the hardware component comprises a sensor, wherein the position of the hardware component is a first position of the hardware component, wherein routing the hardware component alert to the computing device comprises routing the hardware component alert to a robotic device, the method further comprising:
    causing the robotic device to adjust the hardware component from the first position of the hardware component to a second position of the hardware component based at least in part on the hardware component alert;
    receiving sensor data associated with the sensor subsequent to causing the robotic device to adjust the hardware component from the first position of the hardware component to the second position of the hardware component; and
    utilizing the sensor data.

4. The method of claim 1, wherein the motion capture marker is affixed to the hardware component in a fixed position.

5. The method of claim 1, wherein the motion capture marker is affixed to an enclosure associated with the hardware component, wherein the enclosure mates with the hardware component in a fixed position.

6. The method of claim 1, wherein the motion capture marker is affixed to the hardware component or an enclosure associated with the hardware component, the method further comprising:

identifying the calibration threshold, wherein identifying the calibration threshold comprises:
  receiving initial motion capture sensor data associated with the motion capture sensor;
  determining an initial position of the hardware component based at least in part on the initial motion capture sensor data; and
  determining the calibration threshold based at least in part the initial position of the hardware component.

7. The method of claim 1, wherein the motion capture marker comprises a removable marker capture marker, wherein the motion capture marker is affixed to the hardware component in any of a plurality of positions.

8. The method of claim 1, wherein the motion capture marker comprises a removable marker capture marker, wherein the motion capture marker is affixed to the hardware component in any of a plurality of positions, wherein the computing device is a first computing device, the method further comprising:
  receiving, via a second computing device, the calibration threshold.

9. The method of claim 1, wherein the motion capture marker is affixed to the hardware component, the method further comprising:
  identifying a relationship between the motion capture marker and the hardware component, wherein determining the position of the hardware component is further based at least in part on the relationship between the motion capture marker and the hardware component.

10. The method of claim 1, wherein the motion capture marker is affixed to a target of the motion capture sensor wherein receiving the motion capture sensor data associated with the motion capture sensor comprises capturing, using the motion capture sensor, an image of the target, wherein the motion capture sensor data comprises the image of the target.

11. The method of claim 1, wherein the motion capture sensor data is a first motion capture sensor data, the motion capture sensor is a first motion capture sensor, the motion capture marker is a first motion capture marker, and the reference point is a first reference point, wherein the first motion capture marker is affixed to an image sensor, the method further comprising:
  receiving second motion capture sensor data associated with a second motion capture sensor, the second motion capture sensor data comprising at least a location of a second motion capture marker and a location of a second reference point on the vehicle, wherein the second motion capture marker is affixed to a target of the second motion capture sensor, wherein receiving the second motion capture sensor data associated with the second motion capture sensor comprises capturing, using the second motion capture sensor, an image of the target, wherein the second motion capture sensor data comprises the image of the target.

12. The method of claim 1, wherein the motion capture sensor data is a first motion capture sensor data, the motion capture sensor is a first motion capture sensor, the motion capture marker is a first motion capture marker, the reference point is a first reference point, the calibration threshold is a first calibration threshold, the hardware component alert is a first hardware component alert, and the hardware component is a first hardware component, the method further comprising:
  receiving second motion capture sensor data associated with a second motion capture sensor, the second motion capture sensor data comprising at least a location of a second motion capture marker and a location of a second reference point on the vehicle;
  determining a position of a second hardware component associated with the vehicle relative to the second reference point on the vehicle based at least on part on the second motion capture sensor data;
  determining that the position of the second hardware component satisfies a second calibration threshold associated with the second hardware component;
  determining a second hardware component alert associated with the second hardware component based at least in part on the determining that the position of the second hardware component satisfies the second calibration threshold associated with the second hardware component; and
  routing the second hardware component alert, wherein the second hardware component alert identifies that the second hardware component is calibrated.

13. The method of claim 1, wherein the reference point on the vehicle comprises at least one of the vehicle or an additional hardware component associated with the vehicle.

14. The method of claim 1, wherein the hardware component is routed for recalibration based at least in part on the hardware component alert.

15. The method of claim 1, wherein the motion capture marker comprises at least one of:
  an active infrared motion capture marker, wherein the motion capture marker emits infrared light; or
  a passive infrared motion capture marker, wherein the motion capture marker reflects infrared light.

16. The method of claim 1, wherein the motion capture marker comprises a plurality of motion capture markers.

17. The method of claim 1, wherein the hardware component is associated with at least one of a camera image sensor, a lidar sensor, a radar sensor, a pressure sensor, an attachment to the vehicle, a tire of the vehicle, a tire rim of the vehicle, a handle of the vehicle, a mirror of the vehicle, a panel of the vehicle, a window of the vehicle, a door of the vehicle, a trunk of the vehicle, a hood of the vehicle, a sun roof of the vehicle, a lock of the vehicle, or a component enclosed within the vehicle.

18. The method of claim 1, wherein determining the position of the hardware component comprises determining an extrinsic calibration of the hardware component.

19. A system, comprising:
  at least one processor, and
  at least one non-transitory storage media storing instructions that, when executed by the at least one processor, cause the at least one processor to:
    receive motion capture sensor data associated with a motion capture sensor, the motion capture sensor data comprising at least a location of a motion capture marker and a location of a reference point on a vehicle;
    determine a position of a hardware component associated with the vehicle relative to the reference point on the vehicle based at least in part on the motion capture sensor data;
    determine the position of the hardware component does not satisfy a calibration threshold associated with the hardware component;
    determine a hardware component alert associated with the hardware component based at least in part on determining that the position of the hardware component does not satisfy the calibration threshold associated with the hardware component; and route the hardware component alert to a computing device, wherein the position of the hardware component is calibrated based at least in part on routing the hardware component alert to the computing device.

20. At least one non-transitory storage media storing instructions that, when executed by a computing system comprising a processor, cause the computing system to:

receive motion capture sensor data associated with a motion capture sensor, the motion capture sensor data comprising at least a location of a motion capture marker and a location of a reference point on a vehicle;

determine a position of a hardware component associated with the vehicle relative to the reference point on the vehicle based at least in part on the motion capture sensor data;

determine the position of the hardware component does not satisfy a calibration threshold associated with the hardware component;

determine a hardware component alert associated with the hardware component based at least in part on determining that the position of the hardware component does not satisfy the calibration threshold associated with the hardware component; and route the hardware component alert to a computing device, wherein the position of the hardware component is calibrated based at least in part on routing the hardware component alert to the computing device.

* * * * *

UNITED STATES PATENT AND TRADEMARK OFFICE
CERTIFICATE OF CORRECTION

PATENT NO. : 12,322,141 B2
APPLICATION NO. : 17/664830
DATED : June 3, 2025
INVENTOR(S) : Huy Nguyen It is certified that error appears in the above-identified patent and that said Letters Patent is hereby corrected as shown below:

In the Specification

In Column 6, Line 19, delete "Infrastructure (V2X) device)" and insert --Infrastructure (V2I) device)--.

In Column 21, Line 57, delete "hardware component. motion" and insert --hardware component, motion--.

In Column 22, Line 19, delete "sensor data The" and insert --sensor data. The--.

In Column 27, Line 66, delete "occurred and/or and amount" and insert --occurred and/or amount--.

In the Claims

In Column 38, Claim 12, Line 13, delete "on the determining" and insert --on determining--.

Signed and Sealed this
Ninth Day of September, 2025

Coke Morgan Stewart
*Acting Director of the United States Patent and Trademark Office*